United States Patent
Lee

(10) Patent No.: US 7,948,838 B2
(45) Date of Patent: May 24, 2011

(54) DISC DISCRIMINATION METHOD AND APPARATUS

(75) Inventor: Seung Cheol Lee, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 469 days.

(21) Appl. No.: 12/021,144

(22) Filed: Jan. 28, 2008

(65) Prior Publication Data

US 2009/0080305 A1 Mar. 26, 2009

(30) Foreign Application Priority Data

Sep. 21, 2007 (KR) .................. 10-2007-0096464

(51) Int. Cl.
*G11B 7/00* (2006.01)
(52) U.S. Cl. .................. 369/44.27; 369/53.22
(58) Field of Classification Search .................. None
See application file for complete search history.

(56) References Cited

U.S. PATENT DOCUMENTS

| 6,137,766 | A  | * | 10/2000 | Utsumi | 369/275.1 |
| 2003/0133381 | A1 | * | 7/2003 | Choi | 369/53.22 |
| 2005/0041541 | A1 | * | 2/2005 | Tateishi et al. | 369/44.27 |
| 2005/0068873 | A1 | * | 3/2005 | Chung | 369/53.23 |
| 2007/0042294 | A1 | * | 2/2007 | Sugaya et al. | 430/270.11 |

FOREIGN PATENT DOCUMENTS

| KR | 2002-0020524 A | 3/2002 |
| KR | 2003-0061608 A | 7/2003 |
| KR | 10-2005-0031633 A | 4/2005 |

* cited by examiner

*Primary Examiner* — Van N Chow
(74) *Attorney, Agent, or Firm* — Birch, Stewart, Kolasch & Birch, LLP

(57) ABSTRACT

A method for discriminating a type of disc. The method includes receiving a signal having at least first and second peak points generated by an optical beam reflected from a record layer of the disc, comparing amplitudes of the first and second peak points, and determining the type of the disc based on a result of the comparing step.

8 Claims, 9 Drawing Sheets

(a)

(b)

(c)

(d)

(a)

(b)

(a)

(b)

DISC DISCRIMINATION METHOD AND APPARATUS

This application claims the benefit of Korean Patent Application No. 10-2007-0096464, filed on Sep. 21, 2007, which is hereby incorporated by reference as if fully set forth herein.

BACKGROUND OF THE INVENTION

1. Field of the Invention

The present invention relates to a method and apparatus for discriminating a type of disc.

2. Discussion of the Related Art

There are now available a variety of types of storage discs such as a Compact Disc (CD), a Digital Versatile Disc (DVD), a Blu-ray Disc (BD), and a High-Density DVD (HD-DVD). In addition, each disc has different characteristics such as a location of a record layer, an interval between record pits, a wavelength of the used beam, etc.

Therefore, when a recording/reproducing device records or reproduces data on a disc seated in the recording/reproducing unit, the recording/reproducing unit must determine the type of disc (e.g., DVD, HDVD, BD, etc.) and establish or adjust a variety of values according to the type of the seated disc.

SUMMARY OF THE INVENTION

Accordingly, one object of the present invention is to provide a method and apparatus for discriminating a disc type that substantially obviates one or more problems due to limitations and disadvantages of the related art.

Another object of the present invention is to provide a method and apparatus that correctly discriminates the type of a disc seated in a recording/reproducing unit.

To achieve these objects and other advantages and in accordance with the purpose of the invention, as embodied and broadly described herein, the present invention provides a method for discriminating a type of disc. The method includes receiving a signal having at least first and second peak points generated by an optical beam reflected from a record layer of the disc, comparing amplitudes of the first and second peak points, and determining the type of the disc based on a result of the comparing step.

In another aspect, the present invention provides an apparatus for discriminating a type of disc, and which includes a pickup unit configured to apply an optical beam to the disc, a signal detection unit configured to receive a signal having at least first and second peak points generated by the optical beam reflected from a record layer of the disc, and a control unit configured to compare amplitudes of the first and second peak points, and to determine the type of the disc based on a result comparing the amplitudes of the first and second peak points.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
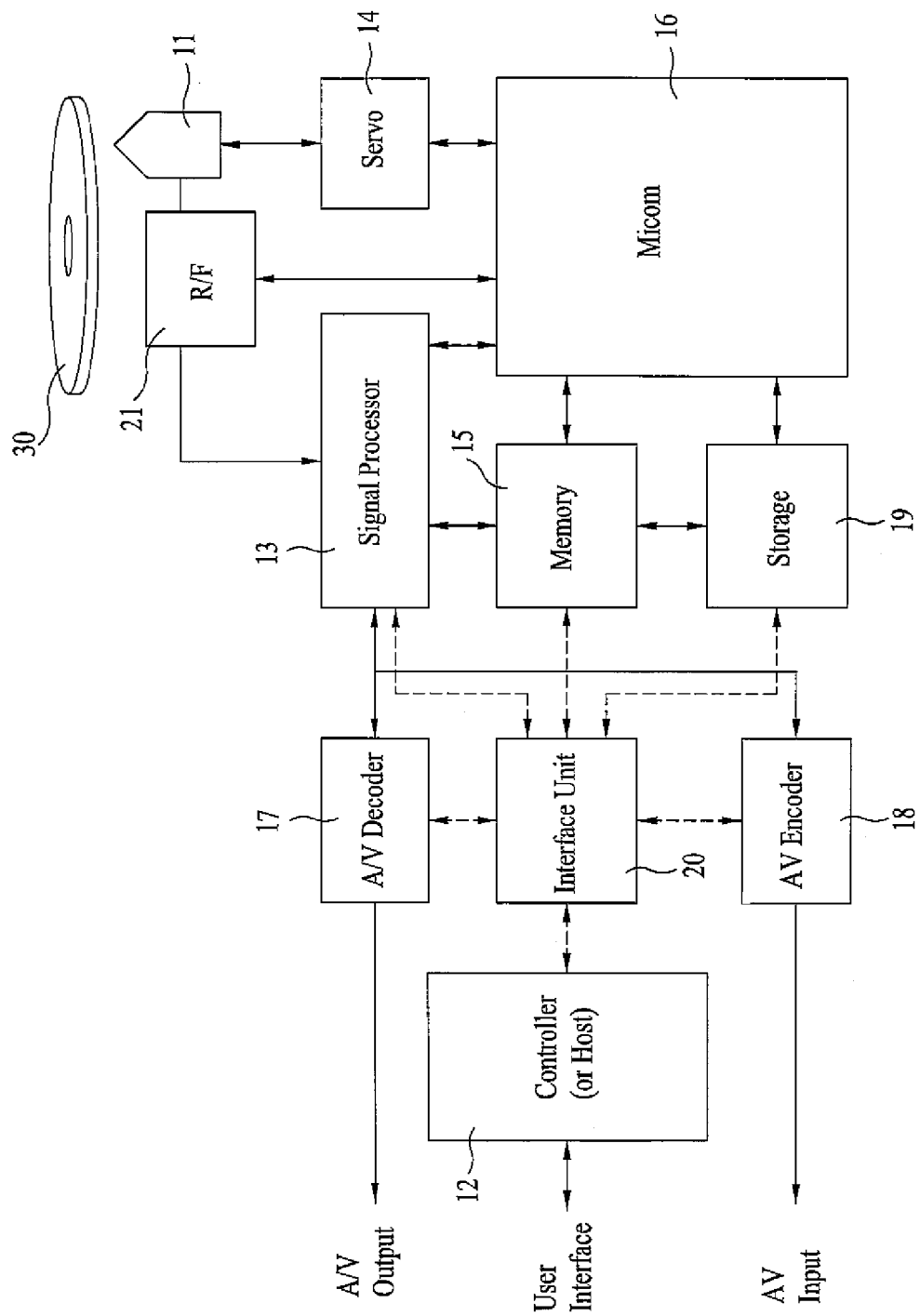
FIG. 1 is a block diagram illustrating a data recording/reproducing device according to an embodiment of the present invention.

FIG. 1 is a block diagram illustrating an apparatus for recording/reproducing data to/from a disc according to an embodiment of the present invention. Further, the data recording/reproducing device can record/reproduce data to/from various optical discs having different formats. The recording/reproducing device can also be configured to record/reproduce data to/from only a specific optical disc (e.g., DVD, BD or HD-DVD) or only to reproduce data from the optical disc without recording data on the disc.

Further, the data recording/reproducing device records or reproduces data to/from a disc 30, receives an external input signal, performs a signal process on the received signal, and transmits the signal processed result to an external display (not shown), such that a user can view the signal processed result on the display.

In addition, the representative external input signals may be determined to be a DMB (Digital Multimedia Broadcasting)-associated signal, an Internet-associated signal, or any other external signal. The Internet is indicative of a communication network to which a user easily gains access, such that the user can download and use specific Internet data using the data recording/reproducing device. The data recording/reproducing device may also record the external input signal on the disc.

As shown in FIG. 1, the data recording/reproducing device includes a pickup unit 11, a servo unit 14, a Radio Frequency (R/F) unit 21, a signal processor 13, a memory 15, and a microprocessor (also called a microcomputer) 16. The pickup unit 11 reads original data recorded on the disc 30 and management information such as reproduction/management file information. The servo unit 14 controls operations of the pickup unit 11.

Further, the R/F unit 21 receives an electric signal from the pickup unit 11, filters/normalizes/amplifies the electric signal, and slices the filtered/normalized result with a reference level. Based on the sliced signal, the RP unit 21 generates a focus error (FE) signal for detecting the separation from a focus of an optical beam, generates a tracking error (TE) signal for detecting the separation from a track of the optical beam, and generates a digital RF signal.

The signal processor 13 receives the digital RF signal from the R/F unit 21, restores the received RF signal to a desired reproduction signal value, or modulates a signal to be recorded on the disc, such that the processor 13 transmits the restored or modulated result. In addition, the memory 15 stores a variety of information used for recording/reproducing data to/from the disc 30, and the microprocessor 16 controls the overall operations of the pickup unit 11, the signal processor 13, the servo unit 14, the memory 15 and the R/F unit 21.

Further, the pickup unit 11, the servo unit 14, the signal processor 13, the memory 15, the microprocessor 16, and the R/F unit 21 may be generally referred to as a recording/reproducing unit. Also, for reproducing or playback of data, the recording/reproducing unit reads data from the optical disc 30 or a storage unit 19 according to a control signal of the controller 12, and provides the decoder with the read data. In other words, the recording/reproducing unit serves as a reproducing unit (also called a player or reader) for reading data from the disc. In addition, for data recording, the recording/reproducing unit receives a signal encoded by the AV encoder 18, and records video or audio data in the disc, so that recording/reproducing unit serves as a recording unit (also called a recorder).

Further, the controller 12 (also called a host) controls the overall operations of the data recording/reproducing device, interfaces with a user to control a reproduction (or playback) operation of the recording medium, and controls the downloading of data existing outside of the recording medium upon receiving a command from the user. In more detail, the controller 12 transmits a command to the recording/reproducing unit via the interface unit 20, so that the recording/reproducing unit performs a specific function corresponding to the received command. The microprocessor 16 also controls the elements of the recording/reproducing unit according to the above-mentioned command.

Further, the controller 12 and the microprocessor 16 may be separated from each other or the functions of the controller 12 and the microprocessor 16 may be combined, so that the controller 12 and the microprocessor 16 can be implemented as a single control unit. The controller 12 may also be implemented with software (e.g., a program) and/or hardware contained in the data recording/reproducing device.

Further, the AV decoder 17 receives data from the disc 30 (also hereinafter called a recording medium) and/or the storage unit 19, and finally decodes the received data into output data according to a control signal of the controller. The AV decoder 17 may include a plurality of decoders according to data categories.

In addition, to record a desired signal on the disc 30, the AV encoder 18 converts an input signal into a specific format signal (e.g., an MPEG2 transport stream) upon receiving a control signal from the controller 12, and transmits the converted result to the signal processor 13. Also, the storage unit 19 is a type of memory that is connected to or contained in the data recording/reproducing device, so that a user can store and use information or data in the storage unit 19. The storage unit 19 may also be a flash memory contained in the data recording/reproducing device, a USB detachably connected to the data recording/reproducing device, a Hard Disk Device (HDD), a memory card, etc.

Further, the storage unit 19 may be used as a storage medium for storing data associated with the recording medium. Also, the data stored in the storage unit 19 while being related to the recording medium may be downloaded from an external part. However, the data may be directly read from the recording medium and stored in the storage unit 19.

The microprocessor 16 controls a laser diode (LD) of the pickup unit 11 to be switched on, and controls the servo unit 14 so that microprocessor 16 can detect a surface reflection signal of the disc 30 and a record-layer reflection signal using the servo unit 15. Upon receiving the surface reflection signal and the record-layer reflection signal from the pickup unit 11, the microprocessor 16 can discriminate the type of the disc.

Figure 2:
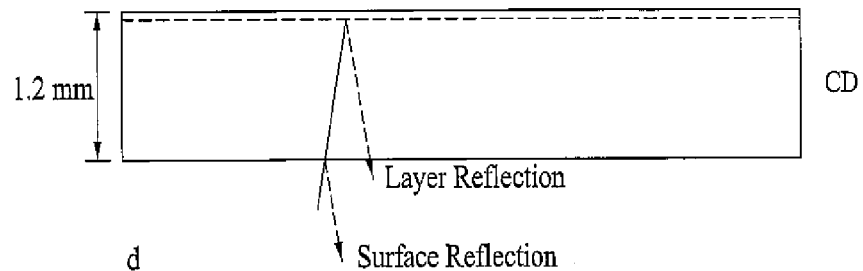
FIGS. 2(a)-2(d) are conceptual diagrams illustrating a method for determining a disc type according to an embodiment of the present invention.
Figure 2:
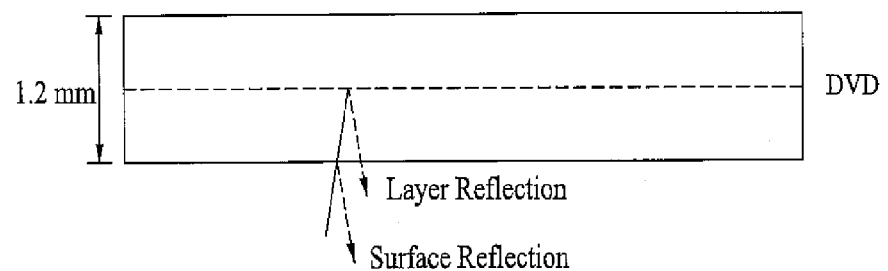
Figure 2:
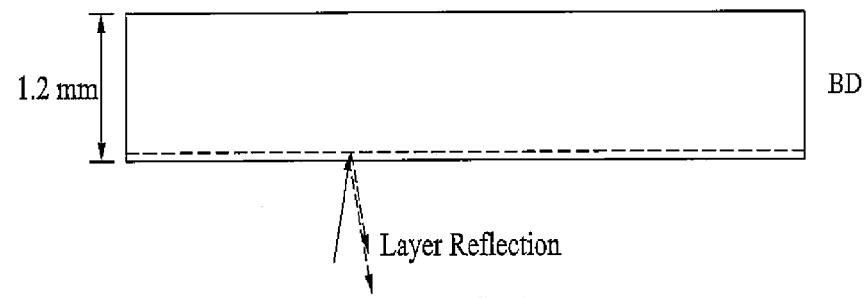
Figure 2:
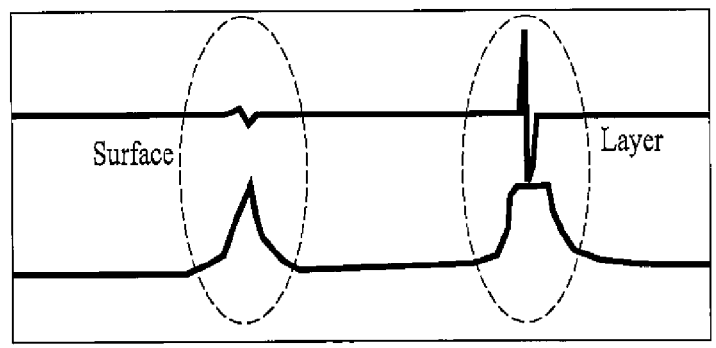

Next, FIGS. 2(*a*)-2(*d*) are conceptual diagrams illustrating a method for determining a disc type according to an embodiment of the present invention. Referring to FIGS. 2(*a*)-2(*d*), the microprocessor 16 receives a reflection signal from a surface of the disc and a reflection signal from the record layer, and determines whether the disc seated in the data recording/reproducing device is a CD-based disc (FIG. 2(*a*)), a DVD-based disc (FIG. 2(*b*)), or a BD-based disc (FIG. 2(*c*)) using the received reflection signals.

In more detail, as shown in FIG. 2(*a*), a record layer of the CD-based disc (e.g., CD-R, CD-RW, or CD-ROM) is adjacent to the surface opposite to an incident plane of the optical beam between both surfaces of the disc. As shown in FIG. 2(*b*), a record layer of the DVD-based disc (e.g., DVD-R, DVD-RAM, DVD+RW, DVD-RW, DVD-ROM, or DVD±RW) is located at the center of the disc, and as shown in FIG. 2(*c*), a record layer of the BD-based disc (e.g., BD-R, BD-RW, or BD-ROM) is adjacent to the incident plane of the optical beam between both surfaces of the disc.

Referring to FIG. 2(*d*), the record layer has different locations according to disc types, so that the microprocessor 16 measures a first time at which a reflected signal of the optical beam incident on the disc is detected, and measures a second time at which a signal reflected from the record layer is detected, so that the microprocessor 16 can recognize the disc type based on a time interval between the first time and the second time.

Further, when the microprocessor 16 controls the pickup unit 11 to move up and down, the optical beam is applied to the disc in a perpendicular direction. In this instance, the microprocessor 16 acquires a signal reflected from the disc, and detects a Sub-Beam ADd (SBAD) signal and a focus error (FE) signal using the above-mentioned signal reflected from the disc. When the SBAD signal and the FE signal are detected, the signal reflected once from the incident surface (also called the incident plane) of the optical beam is detected, and then another signal reflected from the record layer is detected.

Further, record layers of discs of different types are located at different distances from the incident plane of the optical beam, so that the time interval (T) between the reflected signals becomes shorter in the order of the CD-based disc→the DVD-based disc→the BD-based disc. Therefore, the microprocessor 16 can discriminate the type of the disc seated in the data recording/reproducing device based on the time interval (T).

In addition, a multi-layered disc includes a plurality of record layers contained in a single disc. The multi-layered disc includes record layers of different types, or record layers of the same type. For the disc including different record layers, for example, a BD-DVD hybrid disc includes a BD record layer and a DVD record layer, a BD-HDDVD hybrid disc includes a BD-record layer and a HDDVD record layer, and a CD-DVD hybrid disc includes a CD record layer and a DVD record layer. Thus, the above-mentioned discs have different locations on the disc according to the types of the record layers, so that the microprocessor 16 detects the signal (hereinafter referred to as the first reflection signal) reflected from the disc surface and the other signal (hereinafter referred to as the second reflection signal) reflected from the record layers, thereby discriminating the type of the disc.

In addition, for the disc including the same type of record layers such as a DVD-dual disc, the distance from the incident plane of the optical beam to each record layer is very similar, so that the microprocessor 16 has difficulty in discriminating between a DVD-dual disc and a DVD-single disc using the time interval T between the first signal reflected from the disc surface and the second signal reflected from the record layer.

Figure 3:
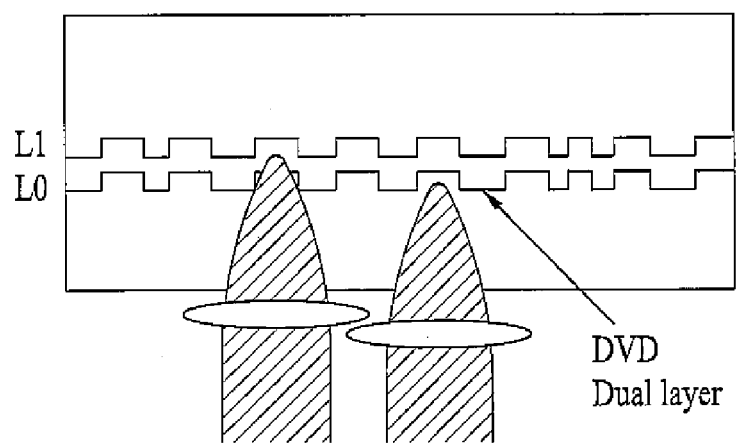
FIGS. 3(a) and 3(b) are a cross-sectional view illustrating a disc including multiple record layers and a graph including a focus error (FE) detection signal, respectively, according to an embodiment of the present invention.
Figure 3:
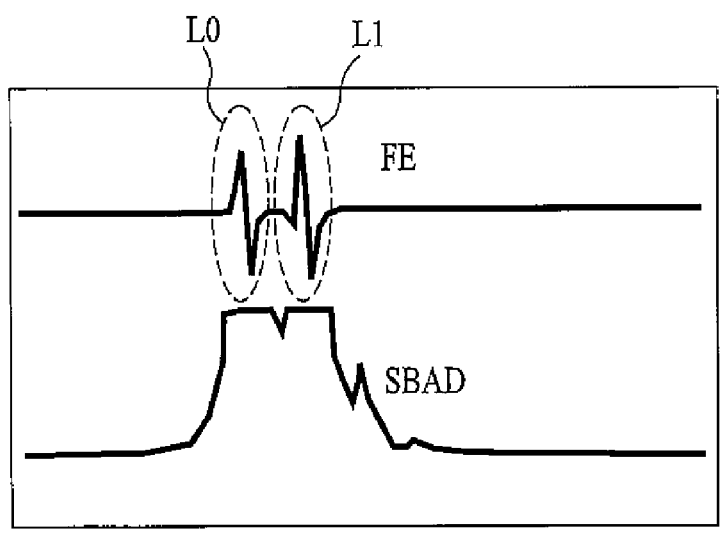

Next, FIGS. 3(*a*) and 3(*b*) are a cross-sectional view illustrating a disc including multiple record layers and a graph illustrating a focus error (FE) detection signal, respectively, according to an embodiment of the present invention. In this example, a DVD-dual disc including two SD (Standard Definition) record layers to record data of an SD-grade resolution will be described.

In FIG. 3(*a*), the DVD-dual disc includes two record layers in the vicinity of 0.6 mm from the disc surface on which the optical beam is incident. As shown, one (L0) of the two record layers is closer to the incident plane of the disc, and the other one (L1) is further from the same incident plane. FIG. 3(*b*) illustrates a Focus Error (FE) reflected signal from the disc shown in FIG. 3(*a*).

Figure 4:
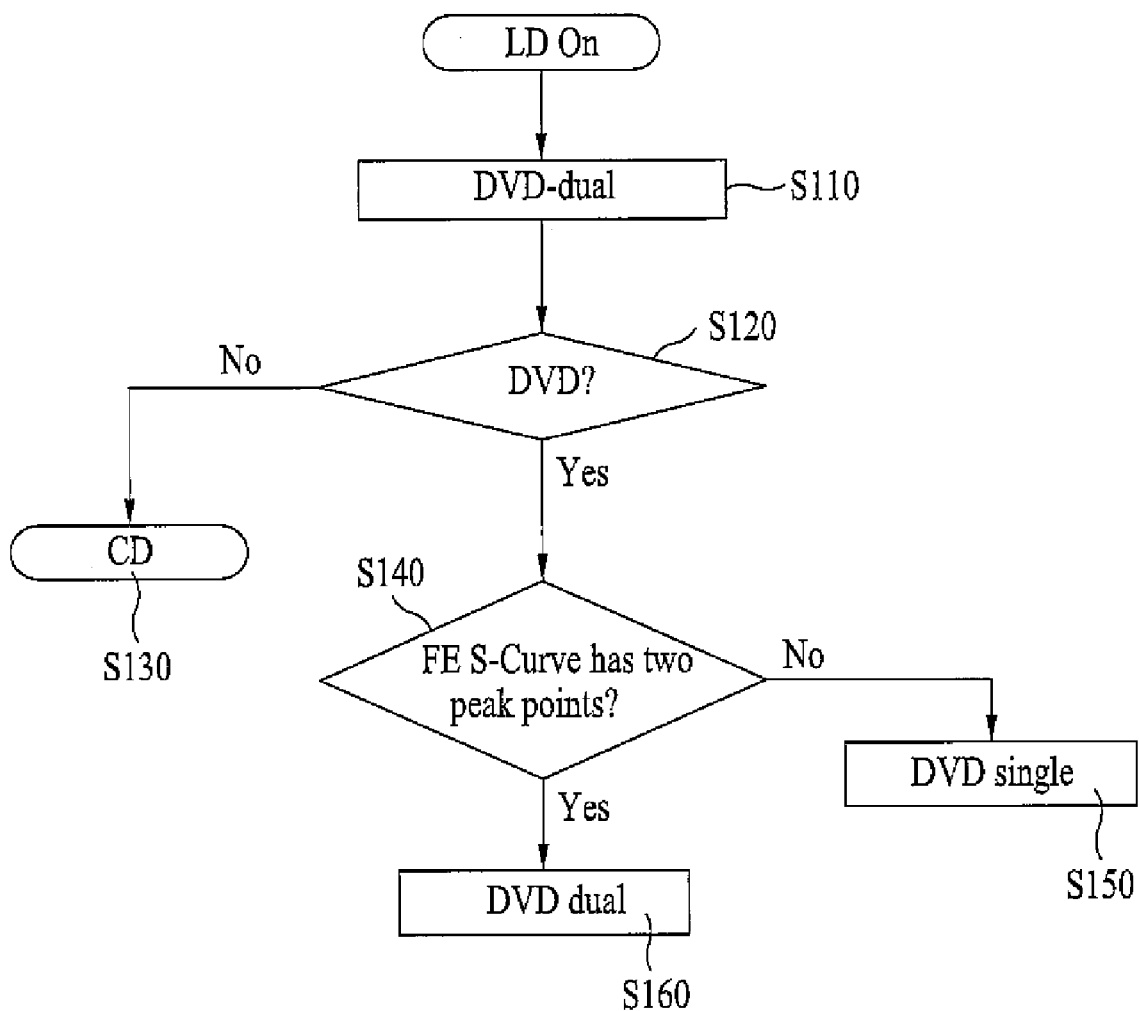
FIG. 4 is a flow chart illustrating a disc discrimination method according to a first embodiment of the present invention.

FIG. 4 is a flow chart illustrating a disc discrimination method according to a first embodiment of the present invention. The disc and reflection signal shown in FIGS. 3(*a*) and 3(*b*) are also referred to in this description.

First, the DVD dual disc shown in FIG. 3(*a*) is placed into the apparatus for recording/reproducing data to/from the DVD (hereinafter referred to as a "DVD recorder/player"), the DVD recorder/player switches on the laser diode of the pickup unit 11, and applies the optical beam with a wavelength of 650 nm to the disc. The R/F unit 21 then receives the first signal reflected from the incident plane of the disc and the second signal reflected from the record layer, and slices the received reflected signals with a detection slice level, so that the SBAD signal and the focus error (FE) signal is detected (step S110).

The microprocessor 16 receives the signals from the R/F unit 21, and determines whether the disc is a DVD-based disc based on both the interval between the SBAD signals and the interval between the FE signals (step S120). If the disc is not equal to the DVD-based disc (No in step S120), the microprocessor 16 determines that the disc is another type of disc such as a CD (step S130). An operation for recording/reproducing the other type of disc (e.g., the CD) depends on whether the data recording/reproducing device includes a CD recorder/player system.

For example, if the data recording/reproducing device includes a laser diode (LD) for generating an infrared beam with a wavelength of 780 nm, data of the corresponding disc will be recorded or reproduced according to the CD recording/reproducing standard. If the disc is determined to be the DVD-based disc, a focus-servo action is executed in the vicinity of the record layer of the disc, i.e., at a depth of 0.6 nm from the incident plane of the disc, so that an S-curve of the focus error (FE) signal is created. Therefore, the microprocessor 16 can discriminate whether the above-mentioned disc is a multi-layered DVD by referring to the shape of the S-curve of the focus error (FE) signal (S140).

For example, the S-curve having two peak points (Yes in step S140) means that two record layers exist at the record-layer location and thereby the reflection occurs twice. Therefore, the DVD recorder/player determines that the disc is equal to the DVD-dual disc (step S160). Further, the S-curve having a single peak point (No in S140) means that the reflection occurs once at the record-layer location, so that the disc is determined to be the DVD-single disc (step S150).

Therefore, the DVD recorder/player can recognize not only the type of discs, but also the number of the record layers. For example, if the number of peak points of the focus error signal at the record-layer location of the DVD-based disc is N, the microprocessor 16 determines the disc has N record layers.

In addition, a hybrid disc includes an SD record layer and an HD or BD record layer. The present description will refer to a hybrid disc including the SD and BD layers (hereinafter referred to as a twin disc). Further, data is recorded or reproduced on or from the SD recording layer using an optical beam with the wavelength of about 650 nm. Also, data is recorded or reproduced on or from the HD record layer using an optical beam with the wavelength of about 405 nm.

When the focus error (FE) signal is detected from the twin disc, the S-curve of the focus error (FE) signal also has a plurality of peak points. However, the data recording/reproducing device cannot determine whether several record layers of the corresponding disc correspond to the SD record layer, the HD record layer, or a hybrid record layer thereof, by referring only to the number of peak points of the S-curve.

Figure 5:
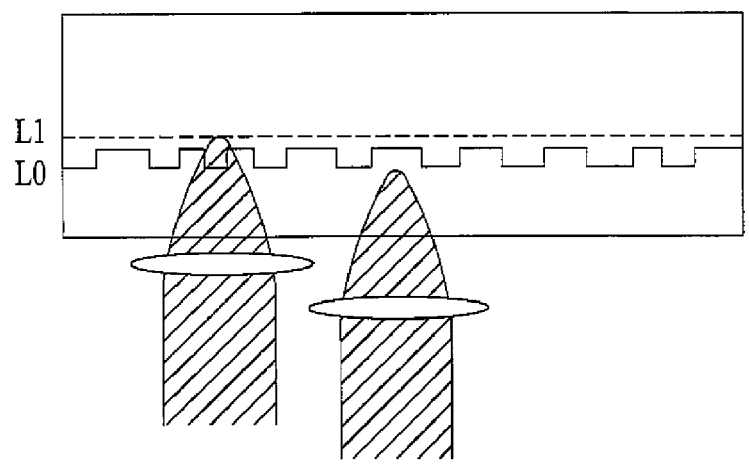
FIGS. 5(a) and 5(b) are a cross-sectional view illustrating structural diagram illustrating a twin disc including a Standard Definition (SD) record layer and a High Definition (HD) record layer and an FE detection signal according to an embodiment of the present invention.
Figure 5:
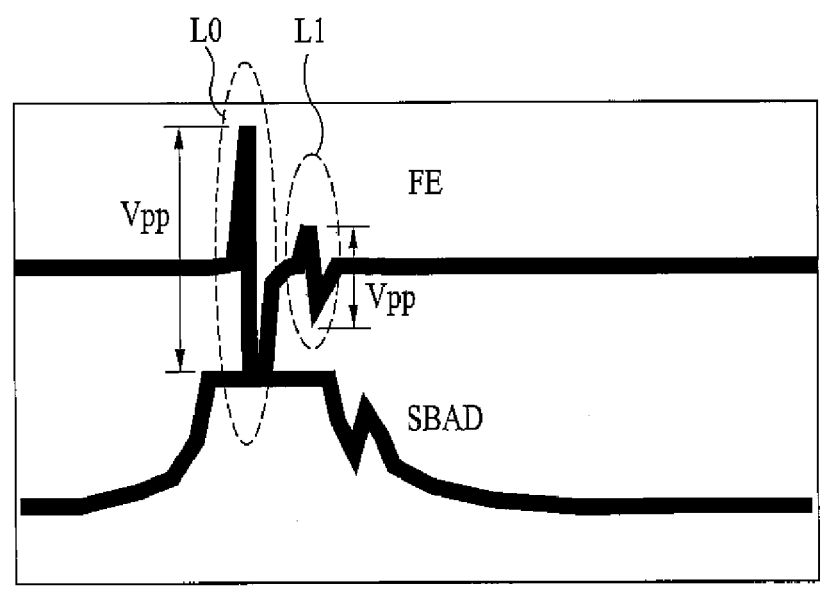

FIGS. 5(*a*) and 5(*b*) are a cross-sectional view illustrating structural diagram illustrating a twin disc including an SD record layer and an HD record layer and an FE detection signal according to an embodiment of the present invention. In this embodiment, a twin HDDVD including a single SD record layer and a single HD record layer will be referred to.

In FIG. 5(*a*), the twin HDDVD includes two record layers at a predetermined depth of about 0.6 mm from the disc surface. Further, the record layer (L0) closer to the incident plane of disc is assumed to be an SD record layer, and the record layer (L1) further from the same incident plane of the disc is assumed to be an HD record layer. The data recording/reproducing device in which the disc is seated is also assumed to be a DVD recorder/player manufactured according to the DVD standard. FIG. 5(*b*) illustrates signals reflected from the disc shown in FIG. 5(*a*).

Figure 6:
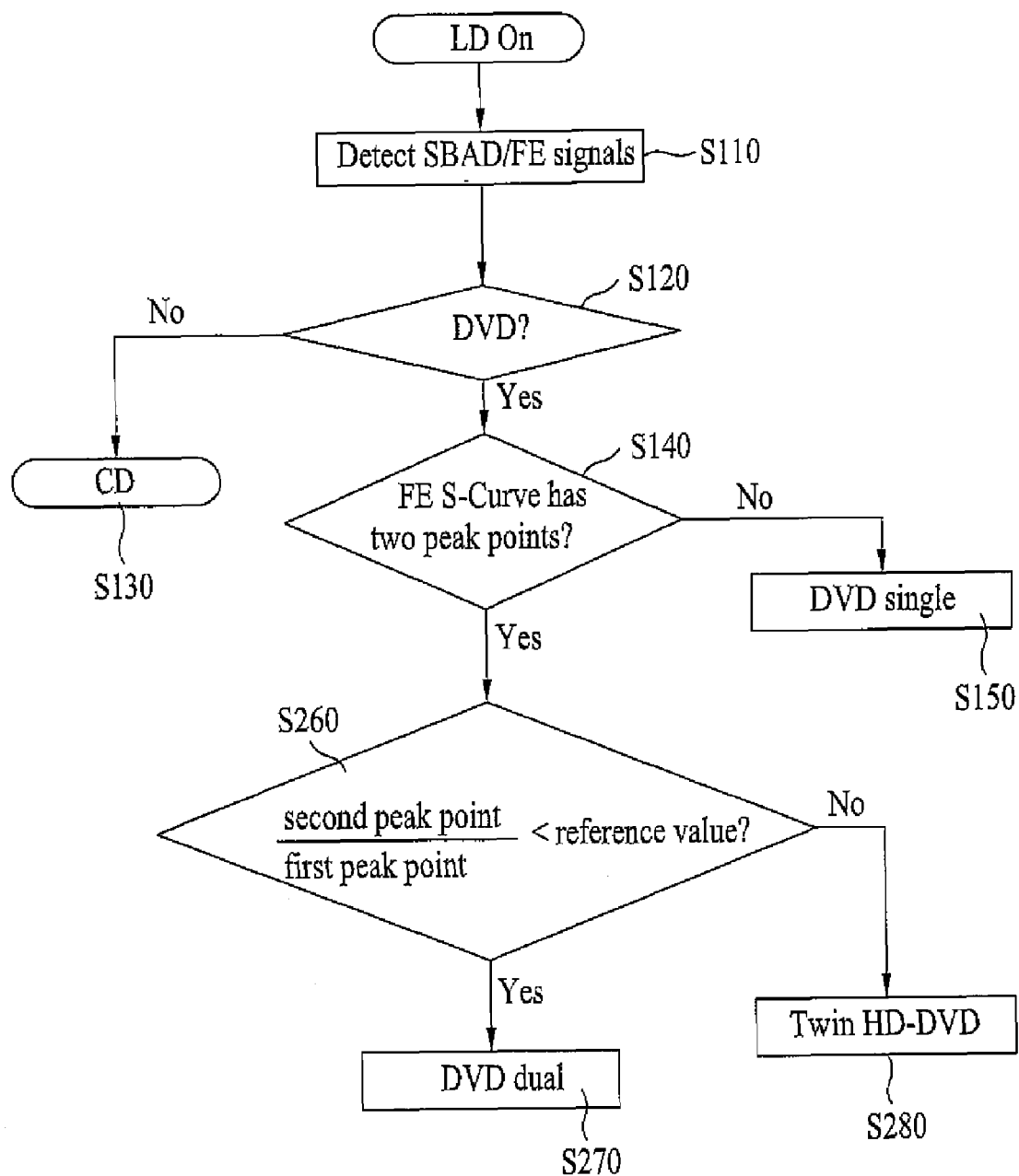
FIG. 6 is a flow chart illustrating a disc discrimination method according to a second embodiment of the present invention.

Next, FIG. 6 is a flow chart illustrating a disc discrimination method according to a second embodiment of the present invention. FIGS. 5(*a*) and 5(*b*) will also be referred to in this description. When the disc is seated in the DVD recorder/player, the DVD recorder/player switches on the laser diode, and applies the optical beam with a wavelength of 650 nm to the disc.

Then, the microprocessor 16 receives the SBAD signal created by the incident optical beam and the focus error signal from the R/F unit 21 (step S110), and determines whether the disc is a DVD-based disc (step S120). If the type of disc is determined to not be a DVD disc (No in step S120), the type of disc is determined to be another type of disc such as a CD (step S130).

If the disc is determined to be a DVD-based disc (Yes in S120), a focus-servo action is executed in the vicinity of the record layer of the disc so that the S-curve of the focus error (FE) signal is created. Then, the microprocessor 16 determines whether the disc is a DVD-single disc or another DVD (hereinafter referred to as a multi-layered DVD) composed of several record layers by referring to the shape of the S-curve of the focus error (FE) signal (step S140). If the signal is determined not to have two peak points (No in step S140), the disc type is determined to be a DVD-single type disk (S150).

Further, the pickup unit of the DVD recorder/player manufactured by the DVD standard generally does not generate an optical beam with the wavelength of 405 nm. Therefore, the DVD recorder/player cannot record/reproduce HD data, so that the twin HDDVD is recognized as a DVD-single. As shown in FIG. 5B, because of the influence of the signal reflected from the HD record layer, the focus error (FE) signal of the twin HDDVD is detected as the S-curve including two peak points, so that the twin HDDVD may be wrongly determined to be the DVD-dual.

Further, the pickup unit of the HD recorder/player manufactured by the HD standard can generate the optical beam of 405 nm and an optical beam of 650 nm. However, if the focus error (FE) of the twin HDDVD is detected as the S-curve including two peak points irrespective of the magnitude of the optical-beam wavelength as shown in FIG. 5B, the twin HDDVD may be wrongly determined to be the DVD-dual type disc.

To solve the above-mentioned problems, the embodiments of the present invention provide a method for correctly determining whether each record layer contained in the disc is an SD or HD record layer. That is, if the S-curve of the focus error (FE) signal is determined to have two peak points in step S140, this means that two record layers exist at the record-layer location so that the reflection occurs twice.

In this instance, the microprocessor 16 must determine whether the disc is the DVD-dual including only two SD layers or the twin HDDVD including a single SD record layer and a single HD record layer. Further, a track pitch of the HD record layer is about 0.32 μm, so that the track pitch of about 0.32 μm in the HD record layer is smaller than that of the SD record layer. Although the 650 nm optical beam having the beam spot of about 1.32 μm is incident on the HD record layer, the beam spot of the 650 nm optical beam is much larger than the track pitch of the HD record layer.

Therefore, a normal signal cannot be generated from the HD record layer by the optical beam of 650 nm. If the 405 nm optical beam having the beam spot of about 0.58 μm is incident on the SD record layer, the beam spot of the 405 nm optical beam is less than the track pitch of the SD record layer, so that the magnitude or amplitude of the reflection signal in the SD record layer becomes higher as compared to the HD record layer to which the 405 nm optical beam is applied.

In other words, the HD record layer generates a focus error (FE) signal less than that of the SD record layer. That is, the amplitude of the focus error (FE) signal generated in the HD record layer by the 650 nm optical beam is about 30~40% of the SD record layer. In conclusion, a difference between the amplitude of the FE signal in the HD record layer and the amplitude of the FE signal in the SD record layer is greater than a difference in amplitude between the same-type record layers.

Therefore, one embodiment of the present invention advantageously measures the S-curve shape and the amplitude ($Vpp=V_H-V_L$) of the peak points of the S-curve, and compares the amplitudes of the peak points with each other, so that the twin HDDVD and the DVD-dual can be distinguished from each other.

For example, the microprocessor 16 determines whether the amplitudes of the peak points are similar to each other. If the amplitudes of the peak points are similar to each other, the corresponding disc is determined to be the DVD-dual disc. Otherwise, if the amplitudes of the peak points are not similar to each other, the corresponding disc is determined to be the twin HDDVD disc, i.e., DVD-single disc.

Next, according to a second embodiment shown in FIG. 6, if the S-curve of the focus error (FE) at the record-layer location of the disc seated in the DVD recorder/player device has two peak points (step S140), the DVD recorder/player compares the amplitude ratio of the two peak points with a predetermined reference value, so the DVD recorder/player determines whether the amplitude ratio is higher than the reference value (step S260). Steps 110, 120 and 130 are similar to the same steps in FIG. 4.

In addition, the amplitude of the signal created when the optical beam is reflected from the HD record layer is about 30~40% of that of the SD record layer, so that the reference value can be determined by this situation. For example, when the reference value is set to 50% or ½, and the percentage of a greater peak point (i.e., a first peak point) between the two peak points to the other peak point (i.e., a second peak point) is higher than the reference value (Yes in step S260), the corresponding disc is determined to be the DVD-dual (step S270).

Otherwise, when the reference value is set to 50% or ½, and the ratio of the first peak point to the second peak point is equal to or less than the reference value (No in step S260), the corresponding disc is determined to be the twin HDDVD (step S280). Therefore, in FIG. 6, the ratio of the first peak point to the second peak point is denoted by "second peak point amplitude/first peak point amplitude".

Figure 7:
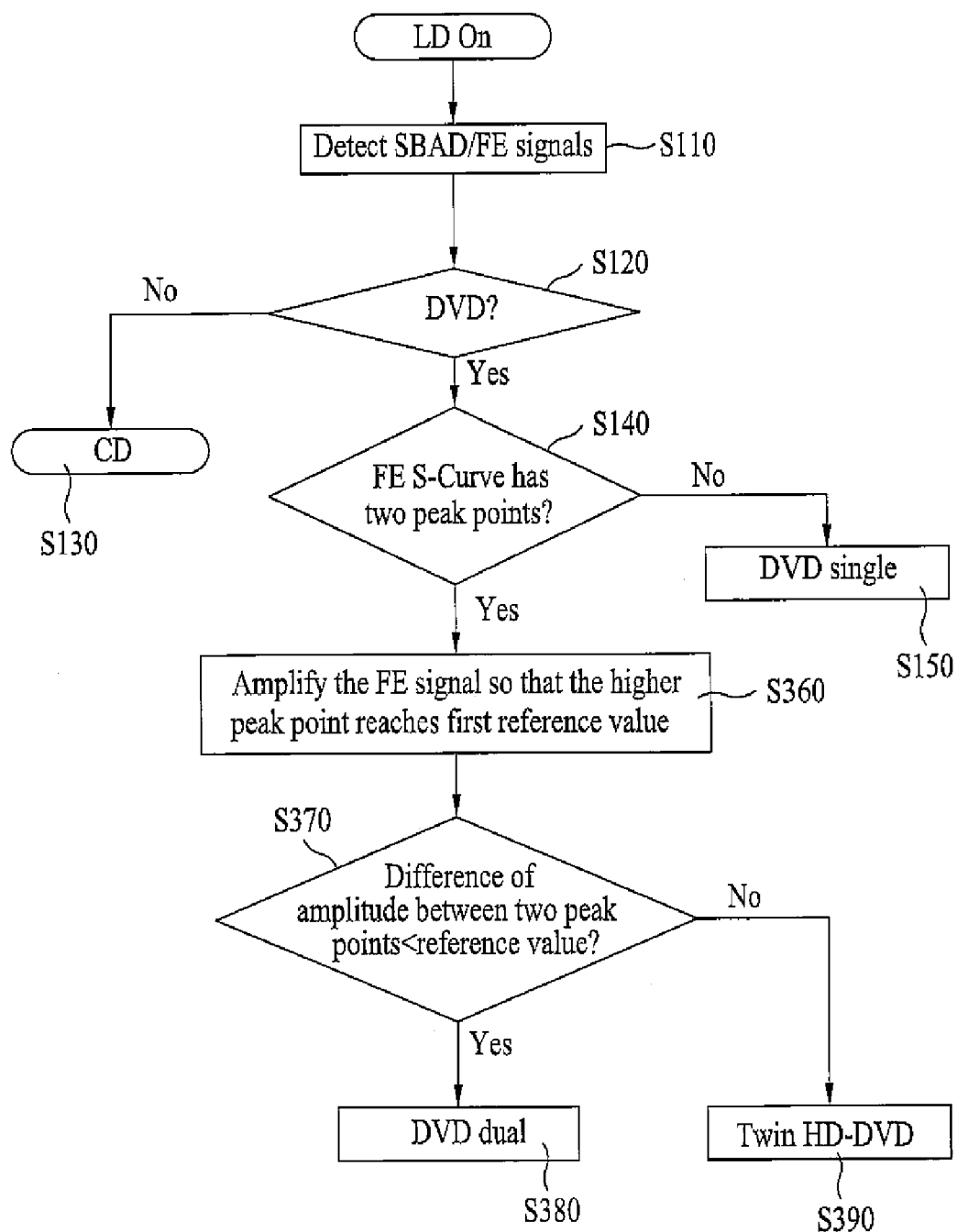
FIG. 7 is a flow chart illustrating a disc discrimination method according to a third embodiment of the present invention.

According to a third embodiment shown in FIG. 7, when the S-curve of the focus error (FE) signal at the record-layer location of the seated disc has two peak points (step S140), the microprocessor 16 controls the R/F unit 21 to amplify the focus error (FE) signal. Further, the focus error (FE) signal is amplified by the R/F unit 21, so that one of the two peak points reaches a first reference value (step S360). Steps 110, 120 and 130 are similar to the same steps in FIG. 4.

For example, if the higher peak point between the two peak points is "X" and the reference value is set to "Y", the R/F unit 21 amplifies the focus error (FE) signal so that a gain (G) reaches the value of "Y/X". The microprocessor 16 receives the amplified focus error (FE) signal, compares a difference in amplitude between the two amplified peak points with a second reference value, and determines whether the difference is larger than the reference value (step S370).

If the difference in amplitude between the two peak points is larger than the second reference value (Yes in step S370), the microprocessor 16 determines that the corresponding disc is the DVD-dual (step S380). Otherwise, if the difference in amplitude between the two peak points is equal to or less than the second reference value (No in Step S370), the microprocessor 16 determines that the corresponding disc is the twin HDDVD (step S390).

Figure 8:
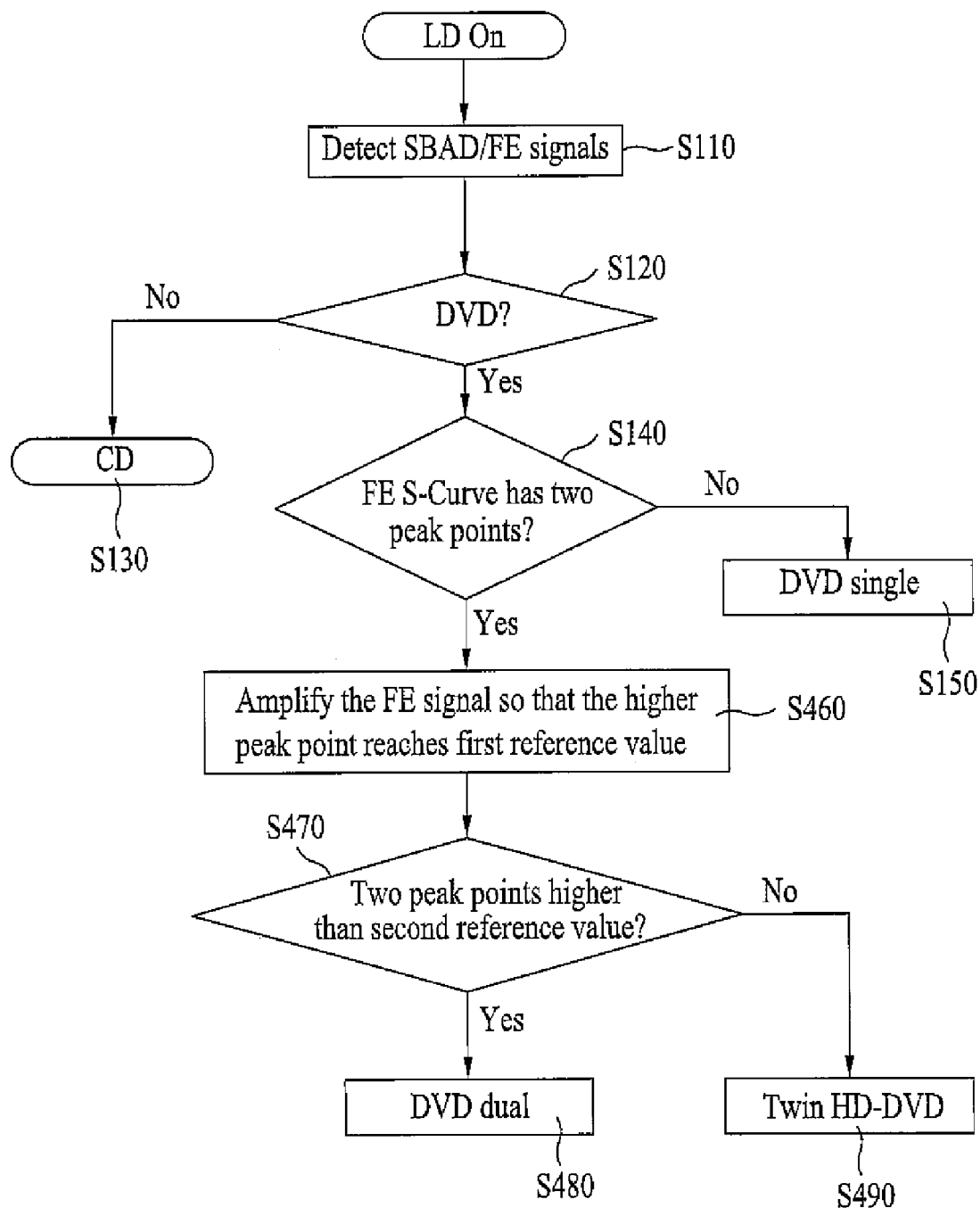
FIG. 8 is a flow chart illustrating a disc discrimination method according to a fourth embodiment of the present invention.

According to the fourth embodiment shown in FIG. 8, if the S-curve of the focus error (FE) signal at the record-layer location of the seated disc has two peak points (step S140), the microprocessor 16 controls the R/F unit 21 to amplify the focus error (FE) signal. Steps 110, 120 and 130 are similar to the same steps in FIG. 4.

Further, the focus error (FE) signal is amplified by the R/F unit 21, so that one of the two peak points reaches a first reference value (step S460). The microprocessor 16 receives the amplified focus error (FE) signal, and checks the number of peak points at which the S-curve amplitude of the amplified focus error (FE) signal is equal to or higher than a second reference value (i.e., a threshold value) (step S470).

Further, if the two peak points are higher than the threshold value (Yes in step S470), the microprocessor 16 determines that the corresponding disc is the DVD-dual (step s480). If only one peak point is higher than the threshold value (No in step S470), the microprocessor 16 determines that the corresponding disc is the twin HDDVD (step S490).

Although the above-mentioned embodiments described using the DVD recorder/player capable of applying the 650 nm optical beam to the disc, the same embodiments can also be applied to other type of apparatuses. In more detail, the pickup unit of the HD recorder/player can generate the 650 nm optical beam so that the pickup unit can be compatible with conventional discs. Although the 405 nm optical beam is applied to the disc, a difference in amplitude between the first reflection signal of the HD record layer and the second reflection signal of the SD record layer exists, so that the present invention can also be easily applied to the HD recorder/player.

Further, although the above-mentioned embodiments describe using the disc composed of two record layers, the present invention can also be used to discriminate another disc composed of several SD record layers and/or several ED record layers.

For example, as shown in the fourth embodiment, if the number of peak points of the focus error (FE) signal created before the amplification is N, and the number of peak points, each of which is higher than the threshold value, of the amplified focus error (FE) signal is M, the microprocessor 16 determines that the corresponding disc has M SD record layers and (N-M) HD record layers.

Figure 9:
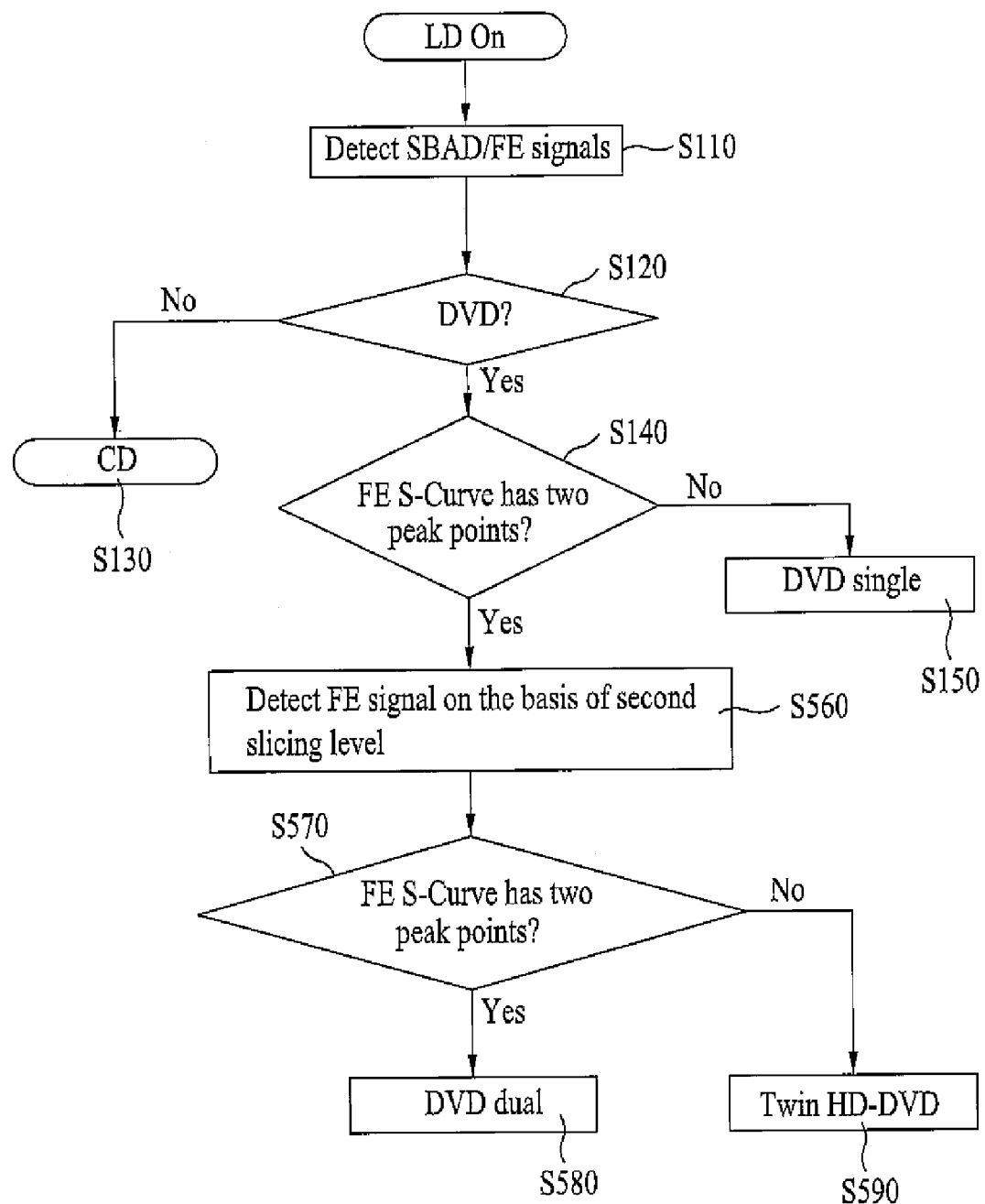
FIG. 9 is a flow chart illustrating a disc discrimination method according to a fifth embodiment of the present invention.

Next, FIG. 9 is a flow chart illustrating a disc discrimination method according to a fifth embodiment of the present invention. Referring to FIG. 9, if the disc is seated in the data recording/reproducing device, the data recording/reproducing device switches on the laser diode so that the 650 nm optical beam is incident on the seated disc.

The microprocessor 16 then receives not only the SBAD signal created by the incident optical beam, but also receives the focus error signal, etc. from the R/F unit 21 (step S110), and determines whether the seated disc is the DVD-based disc (step S120) or another disc (step S130).

The R/F unit 21 detects the SBAD signal and the focus error signal based on the first reflection signal reflected from the disc surface and the second reflection signal reflected from the record layer. In order to properly create or reproduce signals recorded in the disc, the SBAD signal, the focus error (FE) signal, and the track error signal, etc., the microprocessor 16 amplifies the reflection signals with a predetermined gain value.

In addition, a predetermined slicing level is established in the data recording/reproducing device. Further, the R/F unit 21 slices the amplified reflection signals with the above-mentioned slicing level. In other words, the reflection signal higher than the slicing level is converted into a digital RF signal, an SBAD signal, a focus error (FE) signal, and a tracking error signal, etc., so that the converted result is transmitted to the microprocessor 16. Therefore, if each of the above-mentioned reflection signals is equal to or less than the slicing level, the S-curve of the corresponding reflection signal is not detected.

The reflection signal created when the optical beam is reflected from the HD record layer is less than the reflection signal created when the optical beam is reflected from the SD record layer. Therefore, according to the fifth embodiment, the microprocessor 16 establishes or sets the slicing level to disregard the signal reflected from the HD record layer, and excludes the signal reflected from the HD record layer whereas the microprocessor 16 detects the signal reflected from the SD record layer.

Further, the amplitude of the signal reflected from the record layer is affected not only by the above-mentioned information indicating whether the record layer is the SD or HD record layer, but also other information indicating whether the record layer is a read-only record layer or recordable record layer. In addition, the reflection ratio of the read-only record layer is generally higher than that of the recordable record layer.

Also, if the 650 nm optical beam is incident on the same-type record layers having the same resolution, the ratio of amplitudes among three reflection signals is about 7:6:2. In this instance, the first reflection signal from among the three reflection signals is reflected from the read-only record layer, the second reflection signal is reflected from the write-once record layer, and the third reflection signal is reflected from the recordable record layer.

In addition, when establishing the slicing level for detecting the signal reflected from the disc, unnecessary signals caused by defects or dust particles on the disc are preferably excluded by the slicing level and an effective or valid signal is detected by the slicing level. Therefore, the slicing level is generally established so that information stored in the recordable record layer having a relatively-low reflection ratio can be effectively detected.

Further, when the microprocessor 16 detects the focus error (FE) signal caused by the 650 nm optical beam generated from the recordable twin-HDDVD with the slicing level (hereinafter referred to as a first slicing level) based on the recordable. HD record layer, the S-curve caused by the SD record layer is detected, but the S-curve caused by the HD record layer is not detected, so that the S-curve of the focus error (FE) signal has only one peak point.

Therefore, the recordable twin-HDDVD is recognized as the DVD-single type disc based on the number of peak points, and is not recognized as the DVD-dual. However, when the focus error (FE) signal caused by the 650 nm optical beam is detected from the read-only twin-HDDVD at the first slicing level, the microprocessor 16 detects not only the S-curve caused by the SD record layer, but also the S-curve caused by the read-only HD record layer due to the relatively-high reflection ratio of the read-only HD record layer.

In this instance, although the DVD recorder/player must recognize the twin HDDVD as the DVD-single to record/reproduce data to/from the SD record layer, the twin HDDVD is wrongly recognized as the DVD-dual. To solve the above-mentioned problems, and as shown in the embodiment of FIG. 9, if the S-curve has a plurality of peak points (Yes in step S140), the data recording/reproducing device re-detects the focus error (FE) signal based on the second slicing level for the read-only HD record layer (step S560), and discriminates the type of the disc based on the waveform of the S-curve of the re-detected focus error (FE) signal.

Further, the data recording/reproducing device repeats applying the optical beam to the disc, the amplification of the signal reflected from the disc, and slices the amplified result with the second slicing level, so that the data recording/reproducing device can re-detect the focus error (FE) signal.

However, to reduce the time consumed for disc discrimination and the number of operations required for the disc discrimination, the data recording/reproducing device slices the amplified reflection signal with the second slicing level without re-applying the optical beam to the disc, so that the recording/reproducing device may re-detect the focus error (FE) signal.

In addition, the first and second slicing levels are changed according to models of the data recording/reproducing device, and are also changed according to the amplitude of a gain associated with the amplification of the reflection signal to acquire an optimum signal. Therefore, a manufacturer of the data recording/reproducing device preferably establishes the first and second slicing levels suitable for each data recording/reproducing device.

For example, the manufacturer of the data recording/reproducing device may determine the first slicing level to be 200 mV based on the amplitude of a specific signal generated when the 650 nm optical beam is reflected from the recordable SD record layer, and may determine the second slicing level to be 400~500 mV based on the amplitude of another signal generated when the 650 nm optical beam is reflected from the read-only HD record layer, so that the determined slicing levels are established or set in the data recording/reproducing device.

Further, as shown in FIG. 9, the microprocessor 16 receives the re-detected focus error (FE) signal, and determines whether the S-curve of the re-detected focus error (FE) signal has two peak points (step S570). If the S-curve of the re-detected focus error (FE) signal has two peak points in step S570, the microprocessor 16 determines the disc to be the DVD-dual (step S580). Otherwise, if the S-curve of the re-detected focus error (FE) signal has only one peak point (step S570), the microprocessor 16 determines the disc to be a twin HDDVD (i.e., a DVD-single) (step S590).

The fifth embodiment may be applied to not only the above-mentioned case for discriminating the disc including a single SD record layer and a single HD record layer, but also the other case for discriminating a disc composed of several SD record layers and/or several HD record layers. For example, if the S-curve based on the first slicing level has N peak points and the S-curve based on the second slicing level has M peak points, the microprocessor 16 determines that the corresponding disc is a disc composed of M SD record layer and (N-M) HE record layers. The fifth embodiment can also be applied to another case capable of acquiring the focus error (FE) signal by applying the 405 nm optical beam to the disc.

Regarding the above-described embodiments, the microprocessor 16 may also discriminate the order of the SD and HD record layers based on the amplitude of peak points of the focus error signal and the detection order of each peak point. For instance, if a seated disc is determined to be a disc having an HD and a SD record layers and a lower peak point of the peak points from the record layers is detected prior to the other peak point, the microprocessor 16 determines the HD record layer 15 is closer to the incident plane of the disc than the SD record layer.

In addition, the recording medium for use in the present invention includes all recordable mediums, for example, an optical disc, and a magnetic tape, etc., according to various recording schemes.

As apparent from the above description, when discriminating a disc type using an optical beam, embodiments of the present invention advantageously reduces the possibility of mistaking a disc equipped with at least one record layer for another disc. Further, embodiments of the present invention advantageously correctly discriminate not only the types of record layers contained in the disc, but also the number of the record layers, so that the accuracy for discriminating a disc type is increased.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of discriminating a type of disc having a first record layer and a second record layer, the method comprising:
   receiving a signal having a first peak point and a second peak point, the first peak point being generated by an optical beam reflected from the first record layer and the second peak point being generated from an optical beam reflected from the second record layer;
   amplifying the signal so that one of the first and second peak points having a higher peak reaches a threshold value;
   calculating a difference in amplitude between the first and second peak points of the amplified signal;
   comparing the difference in amplitude with a predetermined reference value; and
   determining whether the types of the first record layer and the second record layer are the same or different from each other based on a result of the comparing step.

2. The method of claim 1, wherein the optical beam has a wavelength of about 650 nm, and the received signal is a focus error (FE) signal.

3. The method of claim 1, wherein the determining step determines that the first record layer is a standard definition (SD) record layer and the second record layer is a high definition (HD) layer record layer when the difference is greater than the predetermined reference value.

4. The method of claim 1, wherein the determining step determines that the first and second record layers are standard definition (SD) record layers when the difference is equal or less than the predetermined reference value.

5. An apparatus for discriminating a type of disc having a first record layer and a second record layer, the apparatus comprising:
   a pickup unit configured to apply an optical beam to the disc;
   a signal detection unit configured to receive a signal having first peak point and a second peak point, the first peak point being generated by an optical beam reflected from the first record layer and the second peak point being generated by an optical beam reflected from the second record layer;
   an amplifying unit configured to amplifying the signal; and
   a control unit configured to:
   control the amplifying unit to amplify the signal so that one of the first and second peak points having a higher peak reaches a threshold value,
   calculate a difference in amplitude between the first and second peak points of the amplified signal,
   compare the difference with a predetermined reference value, and
   determine whether the types of the first record layer and the second record layer are the same or different from each other based on a result of the comparison.

6. The apparatus of claim 5, wherein the optical beam has a wavelength of about 650 nm, and the received signal is a focus error (FE) signal.

7. The apparatus of claim 5, wherein the control unit is further configured to determine that the first record layer is a standard definition (SD) record layer and the second record layer is a high definition (HD) record layer when the difference of amplitude is greater than the predetermined reference value.

8. The apparatus of claim 5, wherein the control unit is further configured to determine that the first and second record layers are standard definition (SD) record layers when the difference of amplitude is equal or less than the predetermined reference value.

* * * * *